United States Patent [19]
Hsieh et al.

[11] Patent Number: 5,165,100
[45] Date of Patent: Nov. 17, 1992

[54] OVER-RANGE IMAGE ARTIFACT REDUCTION IN TOMOGRAPHIC IMAGING

[75] Inventors: Jiang Hsieh, Waukesha; William K. Braymer, Muskego; Kevin F. King, New Berlin, all of Wis.; Patrick D. Kosinski, Gouvieux, France

[73] Assignee: General Electric Company, Milwaukee, Wis.

[21] Appl. No.: 800,197

[22] Filed: Nov. 27, 1991

[51] Int. Cl.$^5$ .......................... G06K 9/00; G06F 15/42
[52] U.S. Cl. .................................. 382/6; 364/413.16; 382/50
[58] Field of Search ................. 382/6, 50; 364/413.16, 364/413.18; 378/21

[56] References Cited

U.S. PATENT DOCUMENTS

| | | | |
|---|---|---|---|
| 5,056,146 | 10/1991 | Nishide | 382/6 |
| 5,067,163 | 11/1991 | Adachi | 364/413.13 |
| 5,072,382 | 12/1991 | Kamentsky | 382/6 |
| 5,079,698 | 1/1992 | Grenier et al. | 382/6 |

Primary Examiner—Leo H. Boudreau
Attorney, Agent, or Firm—Quarles & Brady

[57] ABSTRACT

An apparatus for reducing image artifacts caused by over-ranging or clipping of the data collected in a tomographic scan fits a geometric model to the in-range data of each projection. The geometric model is sized to the in-range data by summing all of the data of the projection to obtain a value of the total slice volume. This geometric model is used to compute the slope of the over-range data from the last point of in-range data and this extrapolated data is substituted for the over-range data. The correction process is implemented in pipeline form by convolving an over-range mask indicating which data is in-range and which data is over-range with a box car convolution kernel which produces a trapezoidal correction mask. This correction mask, multiplied by the uncorrected projection data provides the appropriate slope to its clipped portions.

7 Claims, 4 Drawing Sheets

OVER-RANGE IMAGE ARTIFACT REDUCTION IN TOMOGRAPHIC IMAGING

BACKGROUND OF THE INVENTION

This invention relates to tomographic imaging systems, such as x-ray computed tomography. More specifically, the invention relates to a method for reducing image artifacts caused by over-ranged or "clipped" signals acquired by such imaging systems.

Tomographic imaging systems, as considered herein, are imaging systems which produce a tomographic or "slice" picture of an object such as the human body. Such tomographic systems collect a series of "projections" at various angles around the body, each projection made up of measurements of radiation emitted from the body. The radiation may be that transmitted through the body by an external radiation source, such as an x-ray tube, as in X-ray computed tomography ("CT") or the radiation may be that emitted from the body from internally placed radio-pharmaceutical isotopes, e.g. $T_c^{99}$ used in Single Photon Emission Computed Tomography (SPECT).

In an x-ray CT machine, an x-ray source is collimated to form a planar x-ray beam within an x-y plane of a Cartesian coordinate system. The beam is transmitted through the imaged body and received by a generally linear detector array also within this x-y plane.

The detector array is comprised of a plurality of adjacent detector elements each receiving radiation along a single "ray" from the focal spot of the x-ray source to that detector element. Each detector element produces a signal indicating the attenuation of the x-ray beam along that ray by the imaged body. The detector elements, the signal from each detector element, and the ray of the fan beam are all generally referred to as a "channel" of the projection, the particular reference being clear from context.

In one common embodiment, the planar x-ray beam is a "fan beam" radiating from a focal point and the detector array has its elements organized in an arc of constant radius about the focal spot. The x-ray source and detector array may be rotated on a gantry around the imaged object so that the fan beam intersects the imaged object at different angles.

A number of projections are acquired at different gantry angles to form a tomographic projection set. The acquired tomographic set is typically stored in numerical form and may be "reconstructed" by mathematical techniques to yield a slice image. The reconstructed images may be displayed on a conventional CRT tube or may be converted to a film record by means of a computer controlled camera.

The natural evolution of x-ray CT has led to the development of higher powered x-ray sources. Such x-ray sources produce increased x-ray flux which is desirable for two reasons: First, increased flux improves the signal-to-noise ratio in the resulting image, for example, by minimizing the effect of noise. Second, increased flux permits the acquisition of the projection set during a shortened scanning time. Decreasing the scanning time improves patient comfort and helps minimize image artifacts caused by patient motion.

The use of increased x-ray power in an x-ray CT system creates the potential of overwhelming the system's detector signal chain. In particular, the analog-to-digital converter ("ADC") associated with the CT system's data acquisition system ("DAS") may be driven over its range. Such an over-range condition artificially limits the signal from the over range channels to the maximum value of the ADC and causes the data of these channels to be effectively lost.

In the case of a patient scanned by a CT system, the over-range channels will typically be those channels which receive the peripheral rays of the fan beam, e.g. those near the outer edges of the patient. Although these areas of the patient may be diagnostically less important, errors in the data from any channel will cause artifacts in the entire reconstructed image. This spreading of the effects of locally erroneous projection data is caused by the frequency domain filtering implicit in the image reconstruction process, such filtering which spreads the effects of erroneous data over the image.

The problem of over-range channels is similar to the problem created by the truncation of projections when the imaged object extends outside of the fan beam and detector range. Such truncation may occur, for example, when the patient's arms are outside of the fan beam for some projections and in the fan beam for other projections.

U.S. Pat. No. 4,550,371, incorporated by reference and assigned to the same assignee as the present application, provides a means for correcting a truncated projection by calculating the moments of all projections. Unfortunately, this method relies on the assumption that the majority of the projections are not truncated, an assumption which does not hold, in general, for projections having over-range channels.

One proposed method of correcting for the effect of over-range channels involves independently measuring the thickness of the imaged object along the rays associated with the over-range channels and substituting an attenuation value for those rays based on assumption of constant density of the object along those rays. Although some success has been achieved with this approach, the requirement that the thickness of the body be measured independently is cumbersome and commercially impractical.

Ideally, any correction system should operate quickly enough so as not to significantly delay the production of tomographic images from the projection set. Preferably, the correction system should allow correction to begin as the projections are being acquired and should be susceptible to parallel processing in an array processor or the like, such processors as are commonly used for the reconstruction of tomographic images.

SUMMARY OF THE INVENTION

The present invention provides an apparatus for reducing image artifacts caused by the over-range channels of a projection and requiring as an input only the data of that projection and employing techniques compatible with parallel processing.

Specifically, projection data including certain over-range channels is received by a threshold detector which identifies the channels as either in-range or over-range. This determination may be made by evaluating the channel data against the ADC maximum to produce an over-range mask.

An estimator receives the identified channel data from the threshold detector and estimates substitutes values for the over-range channels based on the data of the in-range channels of the same projection set. A combiner then combines the substitute over-range channel data with the in-range channel data prior to the projection set being reconstructed.

It is one object of the invention to provide an over-range correction circuit that does not rely on the existence of projections without over-range channels. The correction circuit estimates the over-range channel data from the in-range channel data of the same projection and thus is indifferent to whether other projections include over-range channels data.

The threshold detector may be a simple comparator comparing the intensity value of each channel to the maximum value of the ADC and identifying as over-range those channels having a value substantially equal to that maximum. The estimator may be a summer for summing together all the in-range channel data to estimate the size of the imaged object, and a slope calculator for estimating the rate of change of the data of the over-range channels, based on a model of the imaged object fit to that estimate of its size.

It is yet another object of the invention, therefore, to provide a simple and robust method of estimating over-range channel data that does not require independent measure of the body being imaged. The measures of the body required for the correction are provided by the model of the imaged object.

The combiner may comprise a mask generator for generating a binary over-range mask indicating which channels are over-range and which channels are in-range. A box car generator may be used to produce a convolution kernel to be convolved with the mask generator signal to produce a correction mask. The projection data may be multiplied by the correction mask to generate the substitute over-range channel data and simultaneously combine that substitute channel data with the in-range channel data. The correction mask may be the convolved over-range mask and kernel clipped to values of less than one-half and then multiplied by two.

Thus, it is another object of the invention to provide a correction circuit suitable for implementation in parallel on an array processor or the like. The operations of convolution, multiplication, clipping and scaling are all readily performed in parallel as required by such processors.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

CT System Hardware

Figure 1A:
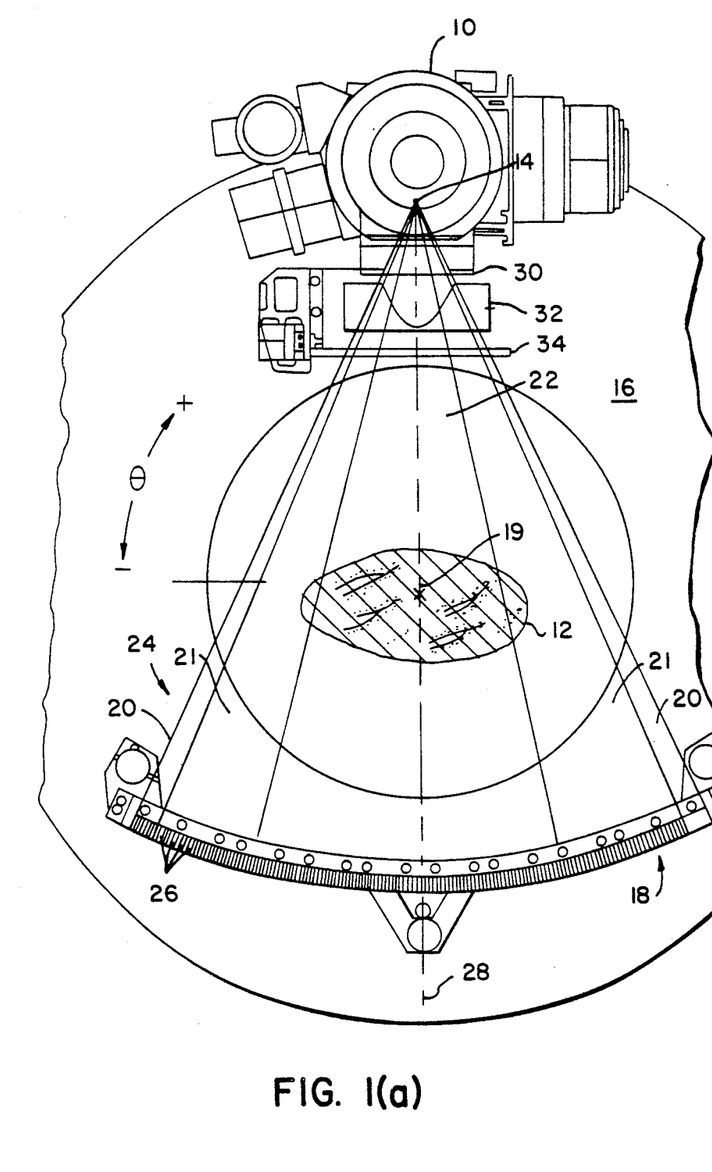
FIGS. 1(a) and (b) are front and side views, in elevation, of a CT gantry showing the relative positions of an x-ray source, detector array and fan beam.
Figure 1B:
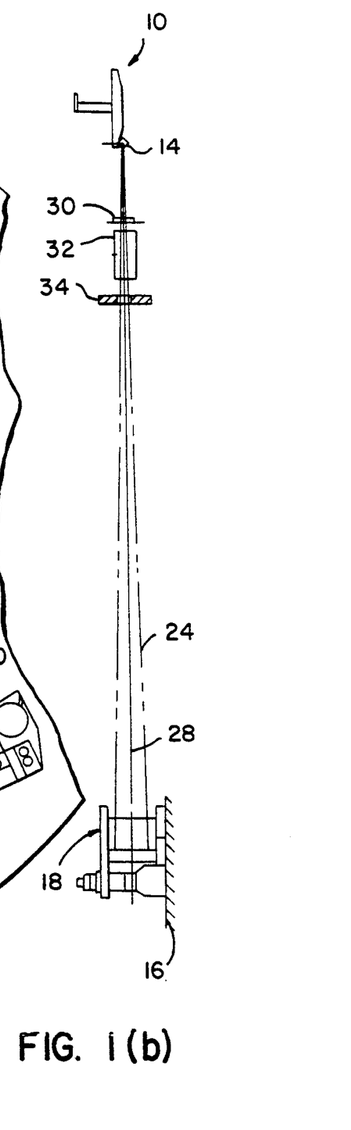

Referring to FIG. 1, a CT gantry 16, representative of that used with a "third generation" CT scanner, holds an x-ray source 10 producing a fan beam of x-rays 24. The fan beam 24 is directed through an imaged object 12, positioned near a center 19 of the gantry 16, to be received by a detector array 18 also attached to the gantry 16. The gantry 16 rotates within an x-y plane of a Cartesian coordinate system, termed the imaging plane, which is generally the same plane as that of the fan beam 24.

The detector array 18 is comprised of a number of detector elements or "channels" 26 positioned adjacent to each other within the imaging plane to subtend the fan beam 24. The channels 26 receive and detect radiation passing from the x-ray source 10, to produce a plurality of channel signals each associated with a particular channel 26. At a given orientation of gantry 16 about imaged object 12, signals for approximately 800 channels may be acquired, representing a detailed picture of the line integral of the attenuation of the fan beam 24 by the imaged object 12 at that angle.

The x-rays of the fan beam 24, immediately after leaving x-rays source 10 and prior to being received by the detector array 18, are filtered by a spectral filter 30 which filters out the lower energy x-rays from the fan beam 24. The fan beam 24 then passes through a bow tie filter 32 having a profile that produces an attenuation in the fan beam 24 complementing that which would be produced by a cylinder of water placed at the center 19 of the gantry 16. The purpose of the bow tie filter 32 is to reduce the range of intensity values received by the detector channels 26 for a typical imaged object 12 and hence to allow for an increase in sensitivity of the detector array 18 and its associated circuitry. This increased sensitivity also, however, increases the chance of a channel being over-range when the imaged object 12 differs significantly from the water cylinder model.

The bow tie filter 32 is followed by an aperture 34 which forms fan beam 24 and may be used to correct the position of the fan beam 24 with respect to the surface of the detector array 18 as described generally in U.S. Pat. No. 5,054,041 issued to the same assignee as that of the present application and incorporated herein by reference.

For a given imaged object 12, the channels 26 may be roughly divided into three groups: reference, over-range, and in-range. Reference channels 20 of the detector array 18 are those intended not to be occluded by the imaged object 12 and may serve the function of calibrating the projection data for variations in the x-ray flux from x-ray source 10, and serve further to provide automatic alignment of the fan beam 24 on the detector array 18. Over-range channels 21 of the detector array 18 are those channels within a given projection which although possibly occluded by the imaged object 12 generally receive x-rays having so little attenuation that the ADC, used to digitize the signals of these channels, is over-ranged. This over-ranging will be described further below. And finally, in-range channels 22 of the detector array 18, frequently but not necessarily near the center of the fan beam 24, are those in a given projection which are sufficiently attenuated by the imaged object 12 or bowtie filter 32 so as not to over-range the ADC used to digitize the signals from these channels.

In general, some over-range channels 21 will be present for substantially all of the projections taken of a convex imaged object 12 subtending less than the entire fan beam.

Figure 2:
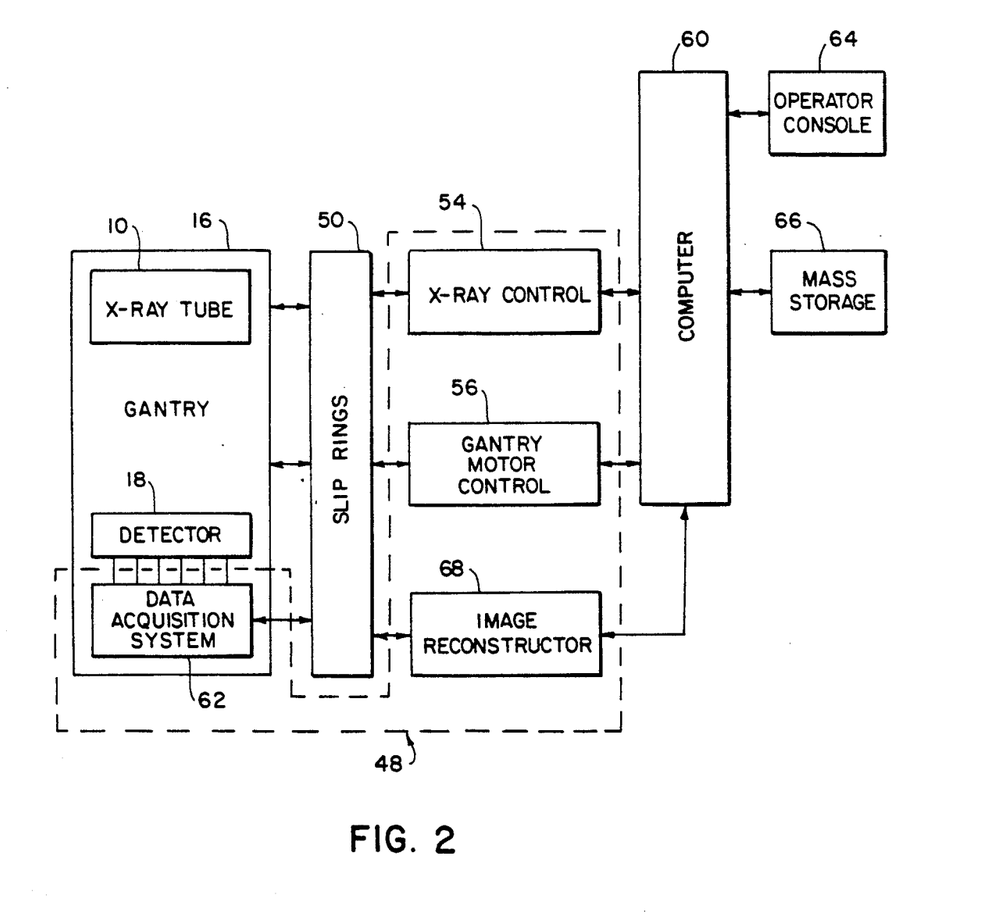
FIG. 2 is a block diagram of a CT control system associated with the gantry of FIG. 1 and useful for practicing the present invention.

Referring to FIG. 2, control circuitry for a CT imaging system suitable for use with the present invention includes a number of functional blocks 48. A data acquisition system 62 such as is generally understood in the art, is connected to the detector array 18 and comprises generally a sampling means (not shown) for sampling the signals from each of the channels 26. An analog to digital converter ("ADC") (not shown) converts the analog signals from each sampled channel 26 to a digital value processing by later circuitry. The ADC has a finite range and generally a trade-off must be established between the range of the intensity signals from each channel 26, that may be correctly digitized, and the resolution of the digitization process. Both considerations are important and a reasoned trade-off will necessarily allow certain situations where the range of the ADC will be exceeded. In the cases of an over-range, the ADC will simply output its maximum value, regardless of how much greater the signal from the channel 26 is than this maximum value.

An x-ray control 54 provides power and timing signals to the x-ray source 10 with regard to the position of gantry 16 to acquire the projections. Gantry motor controller 56 controls the rotational speed and position of the gantry 16 and provides information to the DAS 62 and the x-ray control 54 to permit accurate timing of the projections.

The image reconstructor 68 is a special purpose computer, such as an array processor, capable of very rapid parallel processing or "pipelining" as is necessary to produce images from the large amount of projection data. Array processors suitable for use as the image reconstructor 68 are commercially available from a variety of sources. The image reconstructor 68 receives the sampled and digitized signals from the channels 26 of the detector array 18 via the DAS 62 to perform high speed image reconstruction according to methods known in the art.

A computer 60 coordinates the operation of the DAS 62, the x-ray control 54, and the gantry motor control 56 and works in conjunction with image reconstructor 68 to reconstruct tomographic images from the set of projections acquired by the scanning process. The computer 60 receives commands and scanning parameters via operator console 64 which is generally a CRT display and keyboard which allows the operator to enter parameters for the scan and to display the reconstructed slice images and other information from the computer 60. A mass storage device 66 provides a means for storing operating programs for the CT imaging system, as well as image data for future reference by the operator.

Each of the above elements is connected to its associated elements on the gantry 16 via slip rings 50 to permit continuous rotation of the gantry 16.

Operation of the Correction Process

Figure 4A:
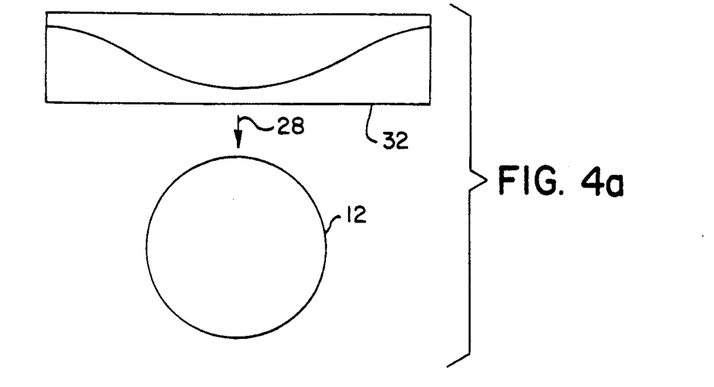
FIG. 4(a)-(f) are graphical representations of an example object being scanned and the signals produced in the present invention.
Figure 4B:
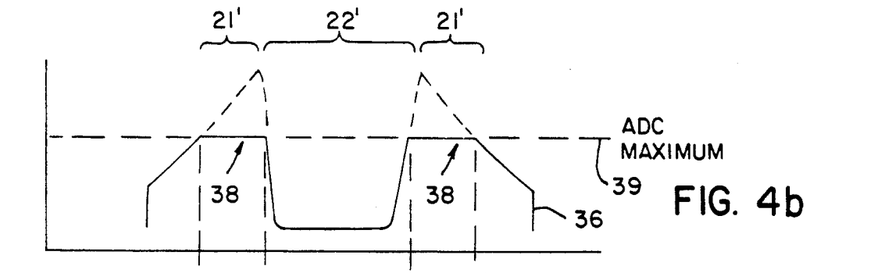

Referring now also to FIGS. 4(a) and (b), for a given position of gantry 16, the DAS 62 will produce a raw projection 36 comprised of the signals from each of the channels 26 of the detector array 18. This raw projection 36 has an in-range portion 22' corresponding to the in-range channels 22 and an over-range portion 21' corresponding to the over-range channels 21. The over-range portion 21' is limited or clipped to the ADC maximum value 39 as has been described above to produce clipped data 38.

Referring momentarily to FIG. 4(a), the in-range portion 22', in this example, corresponds to x-rays passing generally through the midsection of both the imaged object 12, and the bow tie filter 32 whereas the over-range portion 21' corresponds to x-rays intersecting only the edge and hence relatively little thickness of the imaged object 12 and the edge of the bow tie filter 32. The increasing attenuation of the bow tie filter 32 of the x-rays of the over-range portion 21', ultimately brings the raw projection signal 32 back in-range for channels 26 at the extreme edge of the detector array 18. However, at the point where the x-rays of the fan beam 24 first pass on either side of the imaged object 12 without attenuation, the thickness of the bow tie filter 32 will often be insufficient to prevent clipping of the raw projection signal 36 at over-range portion 21'.

It will be understood that in situations other than that illustrated, the over-range portion 21' may be toward the mid-section of the detector array 18, for example if the imaged object 12 is substantially displaced about the isocenter 19. Thus the in-range portion 22' and over-range portion 21' may generally vary in their positions with respect to each other and the detector array 18.

Figure 4C:
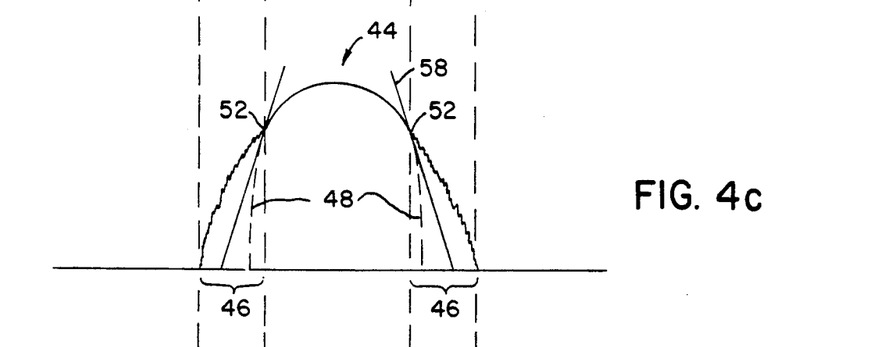
Figure 4D:
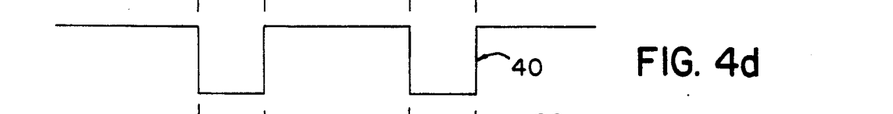

Referring now to FIG. 4(d), the clipped data 38 of the raw projection 36 is readily identified as those portions of the raw projection 36 equal to the ADC maximum 39. Accordingly, an over-range mask 40 may be simply generated by comparing the raw projection 36 to the ADC maximum 39 and setting the over-range mask to "zero" for those points of the raw projection signal 36 substantially equal to the ADC maximum 39 and setting the over-range mask value to "one" for all other points.

Figure 3:
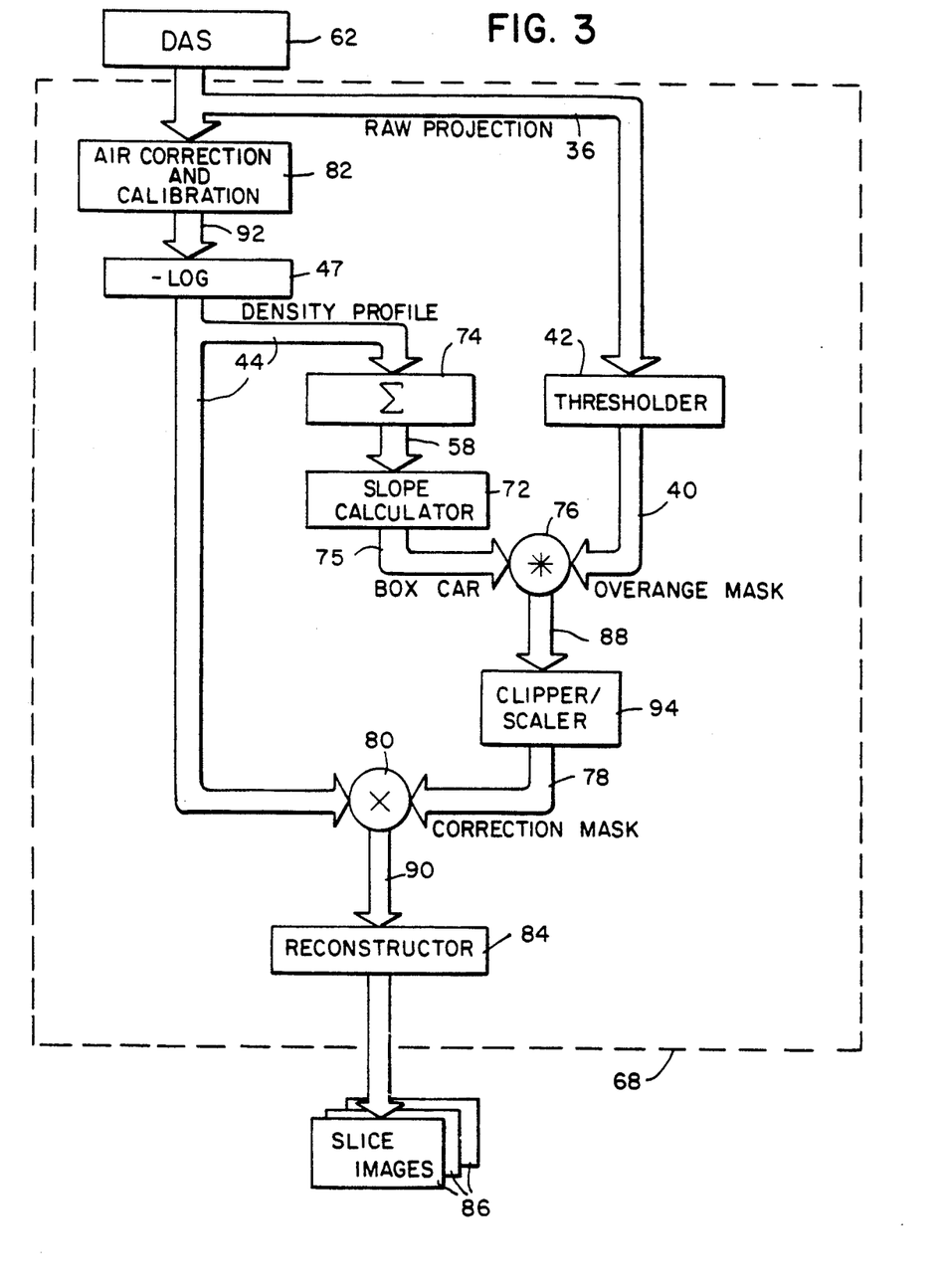
FIG. 3 is a block diagram showing the processing of the data acquired by the CT system according to the present invention.

Referring now to FIG. 3, this thresholding operation is represented by process block 42 which may be implemented by the array processor of the image reconstructor 68.

Referring to FIG. 4(c), the raw projection 36 of FIG. 4(b) is next adjusted for the effects of the bow tie filter 32 and channel to channel gain variations in the detector array 18 at an air correction step, indicated by process block 82, to corrected data 92. The correction of process block 82 is simply a point by point multiplication of the raw projection data 36 times an inverse function representing the compliment of the attenuation of the bow tie filter 32 and the channel to channel gain variations in the detector array 18 to effectively remove the contribution of the bow-tie filter 32 from the corrected data 92. As will be understood in the art, this correction 82 may be followed by other calibration steps, such as beam hardening corrections, etc.

The corrected data is next log adjusted by taking the negative of its logarithm to provide a density profile 44. Density in this case refers not to mass per unit volume but simply to the total amount of attenuating material of the imaged object 12 along the x-ray beam associated with a particular channel 26. The logarithmic correction is required because the attenuation of x-rays (or any radiation) by a medium is generally exponential, as illustrated by the following formula:

$$I = I_0 e^{-\int \mu(x,y) dl}$$

where $I_0$ is the x-ray intensity before it passes through the object having attenuation coefficients $\mu$ given over the x-y plane as μ(x,y), 1 is a distance along the x-ray path, and I is the x-ray intensity after attenuation by the object.

The negating operation simply reflects the fact that decreasing intensity represents increasing density. This correction process is represented in FIG. 3 by process block 47.

Referring now to FIG. 4(c), the density profile 44 includes erroneous data in the areas 46, associated with the raw projection data of over-range portion 21' of FIG. 4(b). The correct data is shown by the dotted lines 48 flanking the central unclipped data of the density profile 44, the latter unclipped data associated with the raw projection data of in-range portion 22' of FIG. 4(b).

Although the clipped channels 46 of the density profile 44 are at the edge of the density profile 44, they will create artifacts throughout the reconstructed image as a result of a convolution of the density profile 44 in the image reconstruction process as will be described. Convolution has the effect of spreading the contribution and effect, of each channel of data in the density profile 44, over the entire reconstructed image. Accordingly, it is necessary to correct even peripheral areas of clipped channels 46 prior to image reconstruction.

The present invention corrects the clipped channels 46 without reference to previous or later projections and without external measurements of the imaged object 12. This is accomplished by employing a simplified model of the imaged object and fitting that model to the in-range channels for that projection.

The use of the model is based on the recognition that the slope of the data of the projections at the start of the areas of clipped data 46, will be directly proportional to the size of the object 12. This relationship is illustrated in the following description. In this description, it will be assumed that the rays of the fan beam 24 are parallel rather than fan beam shaped for the purpose of clarity. The extension of this description to the case of a fan beam is a straightforward geometric transformation that will be understood to those of ordinary skill in the art. It will also be assumed that the imaged object 12 is a simplified geometric solid, preferably a cylinder having radius R and a uniform attenuation coefficient μ. These requirement will be relaxed later.

The density profile of that cylinder is described by the following equation:

$$p(x) = \begin{cases} 2\mu \sqrt{R^2 - x^2} & \text{if } x \leq R \\ 0 & \text{if } x > R \end{cases} \quad (1)$$

The term $2\sqrt{R^2 - x^2}$ is simply the path length along a chord through a cylinder of radius R as a function of its x-coordinate, the x-coordinate being measured along the detector array 18 with a value of x=0 at the center of the detector array 18. For the parallel case, the detector array 18 will be flat rather than curved.

For this cylinder, an over-range of a channel in the density profile 44 will occur for channels where the path length p(x) is less than a predetermined value C. The value C depends on the attenuation coefficient μ of the material of the cylinder, the strength of the x-ray source 10 after passing through the filter 30 and bow tie 32, and on the ADC maximum value 39. Taking the derivative of equation (1), and evaluating it at C provides the slope 58 where over-range starts:

$$\frac{dp(x)}{dx} = \frac{2\mu \sqrt{R^2 - C^2}}{C}$$

at x=C, where μ is the attenuation coefficient of the material of the cylinder.

Since C will be much less than R for most clinical situations, equation (2) can be simplified to:

$$\frac{dp(x)}{dx} \approx -2\mu \frac{R}{C} \ .$$

Equation (3) indicates a linear relationship exists between the radius R of the imaged object 12 and the slope 58 of the density profile 44 at the starting point 52 of the clipped channels 46 (all shown in FIG. 4(c)) where over-range starts. Although this linearity greatly simplifies the estimation of the data of the clipped channels 46, it will be understood that other geometries of the imaged object 12 may be substituted for the cylindrical geometry if increased complexity of calculation performed above may be tolerated. Important, primarily, is that equation (3) suggests that slope will be a function of R for a range of imaged objects 12, and as will be explained below, R may be deduced from the data of a single projection.

In order to take advantage of this functional dependance of the slope 58 of the clipped data in region 46, on the value of the radius R, one must have an estimate of R. This estimate of R is obtained as follows: if, for the assumed parallel geometry, the attenuation of each volume element of the imaged object 12 in the imaging plane is represented by μ(x,y), a projection at a given gantry angle θ may be represented by the following equation:

$$P(\theta,t) = \int_{-\infty}^{\infty} \int_{-\infty}^{\infty} \mu(x,y)\delta(x\cos\theta + y\sin\theta - t)dxdy \quad (4)$$

where δ is the delta function and simply provides a notationally convenient way of generating the line integrals through μ(x,y) of the projection at gantry angle θ, and t is a function of x and y related to the distance of each ray of the projection from the isocenter 19, along a line normal to the path of the ray. The value t corresponds roughly to the position of the channels 26 within the detector array 18.

If we integrate this equation (4) with respect to the variable t, as would be done in practice by summing each value of the density profile 44 together, we obtain:

$$M = \int_{-\infty}^{\infty} \int_{-\infty}^{\infty} \int_{-\infty}^{\infty} \mu(x,y)\delta(x\cos\theta + y\sin\theta - t)dxdydt = \int_{-\infty}^{\infty} \int_{-\infty}^{\infty} \mu(x,y)dxdy \quad (5)$$

Equation (5) is no longer a function of θ indicating that the sum of all the data in the density profile 44 depends solely on the attenuation coefficients μ of the object and is essentially independent of the gantry angle θ and thus of the particular projection acquired. Although this is not true for fan beam geometry, it has been determined that the variations in this integral for a fan beam case are small and thus the integral of equation (5) can be considered constant from projection to projection even for fan beams.

The total attenuation given in equation (5) may be used to estimate the value R. For a cylindrical imaged object the relationship is according to the following formula:

$$R = \sqrt{\frac{M}{\pi \mu}} \quad (6)$$

In the preferred embodiment, however, it is necessary to assume only that the slope 58 is functionally related to the value of M and the exact functionality is determined empirically. Experiments have shown that the relationship between slope 58 and M is roughly linear in the regions of interest and therefore a simple constant of proportionality suffices to define this relationship, such a constant being obtained from measurements of actual patients. In practice, different constants of proportionality are used for images of a patient's head as opposed to images of the patient's torso.

Referring to FIG. 3, this summation to determine M is shown by process block 74. The slope calculation of equation (3) and (6) is represented by process block 72 of FIG. 3.

Referring again to FIG. 4(c), the data of the density profile 44 at areas 46 may be conformed to the value of the slope 58 produced by the slope calculator 72 simply by searching the density profile 44 for the starting points 52 of the clipped channels 46. Working forward and backward from these starting points 52, the density of the starting points 52 may be progressively decreased according to the calculated slope 58 to generate new density values for the clipped channels 46.

Preferably, however, this correction process employs a method compatible with the pipelining capabilities of the array processor in the image reconstructor 68. Specifically, the slope calculator 72, as shown in FIG. 3, produces a "box car" kernel 75, the box car kernel being a binary signal having a values of 1 for a pulse of width $\tau$ chosen so that $$\tau = \frac{2}{\text{slope}}.$$

Figure 4E:
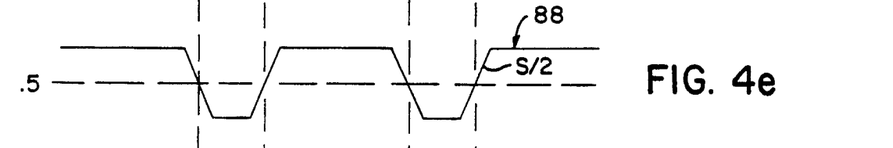

The box car kernel 75 and the over-range mask 40 are convolved by convolver 76 to produce a trapezoidal signal 88, shown also in FIG. 4(e), having half the additional slope S needed to correct the data of the clipped channels 46 to the slope 58 identified by the slope calculator 72. In particular, trapezoidal signal 88 has a peak value of one corresponding to some of the in-range channels of the density profile 44 and a slope of half S, as calculated by the slope calculator 72 corresponding to some of the clipped channels of the density profile 44.

Figure 4F:
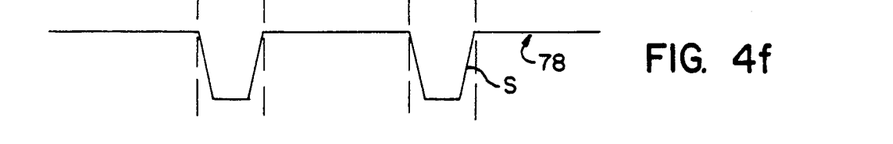

The trapezoidal signal is next clipped to values less than one-half and this clipped signal is multiplied by two producing a correction mask 78, shown also in FIG. 4(f), having a value of one for all of the in-range channels of the density profile 44 and a slope equal to S for the over-range channels. The clipping and scaling is indicated by process block 94.

Referring still to FIG. 3, the correction mask 78 is then multiplied by the density profile 44, as indicated by multiplier 80, so as to correct the data of the density profile in the clipped channels 46, shown in of FIG. 4(c), to produce the desired slope 58 more closely approximating the true density profile 48.

Multiple projections 92 for multiple gantry angles are then reconstructed according to reconstruction methods well understood to those of ordinary skill in the art. One such algorithm is "filtered back projection" which involves a filtering of the projections 92, realized by multiplying the digitized transfer function of the filter times the Fourier transform of the projection 92. It will be recognized that this filtering is equivalent to a convolution of the projection 92, prior to its Fourier transform, with the inverse Fourier transform of the filter's spectral characteristic, and that such convolution effectively spreads errors in the projections 92 over the entire image. As mentioned, image artifacts caused by errors in the projections 92 at the periphery of the imaged object 12 may create image artifacts spreading throughout the image.

After the reconstruction, indicated by process block 84, slice images are available as indicated by process block 86.

It will be noted that the operations contained with the dotted line 68 of FIG. 3, representing those operations performed by the image reconstructor 68, are all suitable for pipeline processing. The requirements for executing a particular step in pipeline form is simply that the operation be capable of being performed on the inputted data of the sequential channels of the projection in their unsorted order without the need to search through or jump back into the channel data that has previously been examined. Because the thresholding of block 42 requires only a comparison of each channel of information against the ADC maximum 39, the thresholding process may be pipelined. The same is true with the summation of process block 74, and the convolution and multiplication of process blocks 76 and 80. Likewise the clipping and scaling of process block 94. The particular implementation of the correction process employing the calculated slope 58 is thus well suited for use in tomographic imaging systems which typically have such processors for performing the reconstruction of the images form the projection data.

Many modifications and variations of the preferred embodiment which will still be within the spirit and scope of the invention will be apparent to those of ordinary skill in the art. For example, the shape and length of the box car kernel used in the convolution of step 76 in FIG. 3 may be varied to account for different models of the imaged object. Accordingly, the clipping and scaling value at 94 of FIG. 3 may also vary. In order to apprise the public of the various embodiments that may fall within the scope of the invention, the following claims are made:

We claim:

1. An over-range correction circuit for use in a tomographic scanner, the scanner measuring a set of intensity values each related to the intensity of received radiation along one of a set of adjacent rays through an imaged object, the intensity values indicating the intensity of the received radiation up to a maximum, and not indicating the intensity of the received radiation above that maximum, the set of intensity values being combined with other sets of intensity values and reconstructed to produce an image, the circuit comprising:

a threshold detector receiving the set of intensity values and for identifying the set of intensity values as in-range intensity values corresponding to received radiation not above the maximum, and over-range intensity values corresponding to received tradition above the maximum;

an estimator receiving the set of intensity values and identified in-range and over-range intensity values and for estimating substitute intensity values for the over-range intensity values based on the values of the in-range intensity values from that same set; and a combiner for combining the in-range intensity values with the substitute intensity values prior to reconstruction of the intensity values into an image.

2. The over-range correction circuit of claim 1 wherein the intensity value for received radiation above the maximum is substantially constant and the threshold detector includes a comparator for comparing each intensity value to the maximum to identify only those intensity values equal to the maximum intensity value as over-range intensity values and the rest as in-range intensity values.

3. The over-range correction circuit of claim 1 wherein the estimator includes:

a summer for summing together all the in-range values of the set of intensity values to estimate the size of the imaged object; and a slope calculator for determining from the estimated size of the imaged object an estimated rate of change in intensity values for the imaged object to produce the substitute intensity values.

4. The over-range correction circuit of claim 3 wherein the slope calculator determines the estimated rate of change in intensity values for the imaged object by multiplying the size of the imaged object by a constant of proportionality.

5. The over-range correction circuit of claim 3 wherein the combiner comprises:

a mask generator for producing a multi-point binary signal having a first value associated with each in-range intensity value and a value of zero associated with each over-range value;

a box car generator for producing a multi-point binary signal having a first value for a predetermined number of points, the number related to the rate of change, and a value of zero for all remaining points;

a convolver for convolving signal from the mask generator with the signal from the box-car generator to produce a convolved signal; and a multiplier for multiplying the in-range intensity values by corresponding values of the convolved signal.

6. The over-range correction circuit of claim 5 wherein the first value equals one and wherein the convolver clips the convolution of the signal from the mask generator and the signal from the box-car generator to values less than one half and then multiplies this clipped signal by two to produce the convolved signal.

7. In a tomographic scanner measuring a set of intensity values each related to the intensity of received radiation along one of a set of adjacent rays through an imaged object, the intensity values indicating the intensity of the received radiation up to a maximum, and not indicating the intensity of the received radiation above that maximum, the set of intensity values being combined with other sets of intensity values and reconstructed to produce an image, a method of correcting for over-range comprising:

generating an over-range mask identifying the set of intensity values as in-range intensity values corresponding to received radiation not above the maximum, and over-range intensity values corresponding to received radiation above the maximum;

estimating substitute intensity values for the over-range intensity values based on the values of the in-range intensity values from that same set from the set of intensity values and the over-range mask; and combining the in-range intensity values with the substitute intensity values prior to reconstruction of the intensity values into an image.

* * * * *